US011095930B2

(12) United States Patent
Lewis et al.

(10) Patent No.: US 11,095,930 B2
(45) Date of Patent: *Aug. 17, 2021

(54) METHODS, SYSTEMS, AND MEDIA FOR INDICATING VIEWERSHIP OF A VIDEO

(71) Applicant: Google LLC, Mountain View, CA (US)

(72) Inventors: Justin Lewis, South San Francisco, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,363

(22) Filed: Feb. 3, 2020

(65) Prior Publication Data
US 2020/0177937 A1    Jun. 4, 2020

Related U.S. Application Data

(63) Continuation of application No. 15/843,886, filed on Dec. 15, 2017, now Pat. No. 10,555,015, which is a (Continued)

(51) Int. Cl.
H04N 21/25      (2011.01)
H04N 21/442     (2011.01)
(Continued)

(52) U.S. Cl.
CPC ..... H04N 21/252 (2013.01); H04N 21/25891 (2013.01); H04N 21/4312 (2013.01);
(Continued)

(58) Field of Classification Search
CPC .......... H04N 21/252; H04N 21/25891; H04N 21/4312; H04N 21/44204; H04N 21/4532;
(Continued)

(56) References Cited

U.S. PATENT DOCUMENTS 8,756,278 B2  6/2014 Sittig et al.
9,396,195 B1* 7/2016 Beguelin ............ H04N 21/4826
(Continued)

FOREIGN PATENT DOCUMENTS

WO    WO 2011147089    12/2011

OTHER PUBLICATIONS

International Search Report and Written Opinion dated Feb. 24, 2017 in International Patent Application No. PCT/US2016/065651.
(Continued)

Primary Examiner — Mulugeta Mengesha
Assistant Examiner — Alazar Tilahun
(74) Attorney, Agent, or Firm — Byrne Poh LLP

(57) ABSTRACT

Methods, systems, and media for indicating viewership of a video are provided. In some embodiments, the method comprises: identifying a video; identifying a first group of users; determining an affinity score for each user with the identified video; receiving a request to present a page that includes a representation of the video; identifying a second group of users connected to the first user associated with the user device; determining a viewership status of each user in the second group of users corresponding to the video; identifying a subset of users in the second group of users based at least in part on the viewership status; and causing groups of indicators to be presented on the user device, wherein each indicator in the groups of indicators represents the viewership status of the user, and wherein the indicators are presented on the requested page in connection with the representation of the video.

21 Claims, 6 Drawing Sheets

Related U.S. Application Data continuation of application No. 15/088,963, filed on Apr. 1, 2016, now Pat. No. 9,877,053.

(51) Int. Cl.
| | |
|---|---|
| *H04N 21/258* | (2011.01) |
| *H04N 21/431* | (2011.01) |
| *H04N 21/45* | (2011.01) |
| *H04N 21/466* | (2011.01) |
| *H04N 21/482* | (2011.01) |
| *G06F 16/44* | (2019.01) |
| *G06F 16/74* | (2019.01) |
| *G06Q 50/00* | (2012.01) |
| *H04N 21/4788* | (2011.01) |

(52) U.S. Cl.
CPC ... *H04N 21/44204* (2013.01); *H04N 21/4532* (2013.01); *H04N 21/4668* (2013.01); *H04N 21/4826* (2013.01); *G06F 16/44* (2019.01); *G06F 16/745* (2019.01); *G06Q 50/01* (2013.01); *H04N 21/44222* (2013.01); *H04N 21/4667* (2013.01); *H04N 21/4788* (2013.01)

(58) Field of Classification Search
CPC ........... H04N 21/4668; H04N 21/4826; H04N 21/44222; H04N 21/4667; H04N 21/4788; G06F 16/44; G06F 16/745; G06Q 50/01
See application file for complete search history.

(56) References Cited

U.S. PATENT DOCUMENTS

| | | | |
|---|---|---|---|
| 2009/0265737 | A1 | 10/2009 | Issa et al. |
| 2013/0268543 | A1 | 10/2013 | Andler et al. |
| 2014/0279039 | A1* | 9/2014 | Systrom ............ G06Q 30/0224 |
| | | | 705/14.66 |
| 2014/0297739 | A1* | 10/2014 | Stein ................. G06Q 30/0241 |
| | | | 709/204 |
| 2015/0058751 | A1* | 2/2015 | Tseng ..................... H04L 67/12 |
| | | | 715/753 |
| 2015/0067724 | A1 | 3/2015 | Johnson et al. |
| 2015/0089517 | A1 | 3/2015 | Ruffini et al. |
| 2015/0095329 | A1 | 4/2015 | Sanio et al. |
| 2015/0213119 | A1* | 7/2015 | Agarwal ................ G06Q 50/01 |
| | | | 707/737 |

OTHER PUBLICATIONS

Notice of Allowance dated Sep. 23, 2019 in U.S. Appl. No. 15/843,886.
Notice of Allowance dated Oct. 16, 2017 in U.S. Appl. No. 15/088,963.
Office Action dated Feb. 15, 2017 in U.S. Appl. No. 15/088,963.
Office Action dated Apr. 18, 2018 in U.S. Appl. No. 15/843,886.
Office Action dated Jun. 22, 2017 in U.S. Appl. No. 15/088,963.
Office Action dated Nov. 26, 2018 in U.S. Appl. No. 15/843,886.
Examination Report dated Jun. 9, 2020 in EP Patent Application No. 16823093.6.
Summons to Attend Oral Proceedings dated Apr. 9, 2021 in EP Patent Application No. 16823093.6.

* cited by examiner

METHODS, SYSTEMS, AND MEDIA FOR INDICATING VIEWERSHIP OF A VIDEO

CROSS-REFERENCE TO RELATED APPLICATIONS

This application is a continuation of U.S. patent application Ser. No. 15/843,886, filed Dec. 15, 2017, which is a continuation of U.S. patent application Ser. No. 15/088,963, filed Apr. 1, 2016, each of which is hereby incorporated by reference herein in its entirety.

TECHNICAL FIELD

The disclosed subject matter relates to methods, systems, and media for indicating viewership of a video.

BACKGROUND

Many users browse video sharing sites to find and watch a video. For example, a user may browse a listing of available videos, and the listing may include the title of the video, a genre of the video, and other information. In some instances, it can be difficult for the user to determine whether they are likely to enjoy the video. However, learning that friends of the user have watched the video or liked the video may assist the user in deciding that they are likely to enjoy the video as well.

Accordingly, it is desirable to provide methods, systems, and media for indicating viewership of a video.

SUMMARY

Methods, systems, and media for indicating viewership of a video are provided. In accordance with some embodiments of the disclosed subject matter, a method for indicating viewership of a video is provided, the method comprising: identifying a video based at least in part on a viewing history of a first user associated with a user device; identifying a first group of users; determining, for each user in the first group of users, an affinity score for each user with the identified video; receiving a request to present a page that includes a representation of the video; in response to receiving the request, identifying a second group of users connected to the first user associated with the user device, wherein the second group of users is a subset of the first group of users; determining a viewership status of each user in the second group of users corresponding to the video, wherein the viewership status corresponds to one of a plurality of categories; identifying a subset of users in the second group of users based at least in part on the viewership status; and causing a plurality of groups of indicators corresponding to the plurality of categories to be presented on the user device, wherein each indicator in the group of indicators represents the viewership status of the user and corresponds to a user in the identified subset of users, and wherein the plurality of groups of indicators is presented on the requested page in connection with the representation of the video.

In accordance with some embodiments of the disclosed subject matter, a system for indicating viewership of a video is provided, the system comprising: a hardware processor that is programmed to: identify a video based at least in part on a viewing history of a first user associated with a user device; identify a first group of users; determine, for each user in the first group of users, an affinity score for each user with the identified video; receive a request to present a page that includes a representation of the video; in response to receiving the request, identify a second group of users connected to the first user associated with the user device, wherein the second group of users is a subset of the first group of users; determine a viewership status of each user in the second group of users corresponding to the video, wherein the viewership status corresponds to one of a plurality of categories; identify a subset of users in the second group of users based at least in part on the viewership status; and cause a plurality of groups of indicators corresponding to the plurality of categories to be presented on the user device, wherein each indicator in the group of indicators represents the viewership status of the user and corresponds to a user in the identified subset of users, and wherein the plurality of groups of indicators is presented on the requested page in connection with the representation of the video.

In accordance with some embodiments of the disclosed subject matter, non-transitory computer-readable media containing computer executable instructions that, when executed by a processor, cause the processor to perform a method for indicating viewership of a video. The method comprises: identifying a video based at least in part on a viewing history of a first user associated with a user device; identifying a first group of users; determining, for each user in the first group of users, an affinity score for each user with the identified video; receiving a request to present a page that includes a representation of the video; in response to receiving the request, identifying a second group of users connected to the first user associated with the user device, wherein the second group of users is a subset of the first group of users; determining a viewership status of each user in the second group of users corresponding to the video, wherein the viewership status corresponds to one of a plurality of categories; identifying a subset of users in the second group of users based at least in part on the viewership status; and causing a plurality of groups of indicators corresponding to the plurality of categories to be presented on the user device, wherein each indicator in the group of indicators represents the viewership status of the user and corresponds to a user in the identified subset of users, and wherein the plurality of groups of indicators is presented on the requested page in connection with the representation of the video.

In accordance with some embodiments of the disclosed subject matter, a system for indicating viewership of a video is provided, the system comprising: means for identifying a video based at least in part on a viewing history of a first user associated with a user device; means for identifying a first group of users; means for determining, for each user in the first group of users, an affinity score for each user with the identified video; means for receiving a request to present a page that includes a representation of the video; in response to receiving the request, means for identifying a second group of users connected to the first user associated with the user device, wherein the second group of users is a subset of the first group of users; means for determining a viewership status of each user in the second group of users corresponding to the video, wherein the viewership status corresponds to one of a plurality of categories; means for identifying a subset of users in the second group of users based at least in part on the viewership status; and means for causing a plurality of groups of indicators corresponding to the plurality of categories to be presented on the user device, wherein each indicator in the group of indicators represents the viewership status of the user and corresponds to a user in the identified subset of users, and wherein the plurality of groups of indicators is presented on the requested page in connection with the representation of the video.

In some embodiments, the plurality of categories includes users who have endorsed the video on a social networking service.

In some embodiments, the plurality of categories includes users who are determined as having a likelihood of viewing the video.

In some embodiments, the means for identifying the subset of users in the second group of users further comprise means for determining a strength of a relationship between each user in the second group of users and the first user associated with the user device, wherein the subset of users in the second group of users is identified based on the strength of the relationship.

In some embodiments, the system further comprises means for verifying the strength of the relationship between each user in the subset of users in the second group of users with the first user associated with the user device prior to causing the plurality of groups of indicators to be presented.

In some embodiments, the system further comprises means for verifying the viewership status of each user in the subset of users in the second group of users prior to causing the plurality of groups of indicators to be presented.

In some embodiments, a first group of indicators in the plurality of groups of indicators has a different visual appearance than a second group of indicators in the plurality of groups of indicators.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
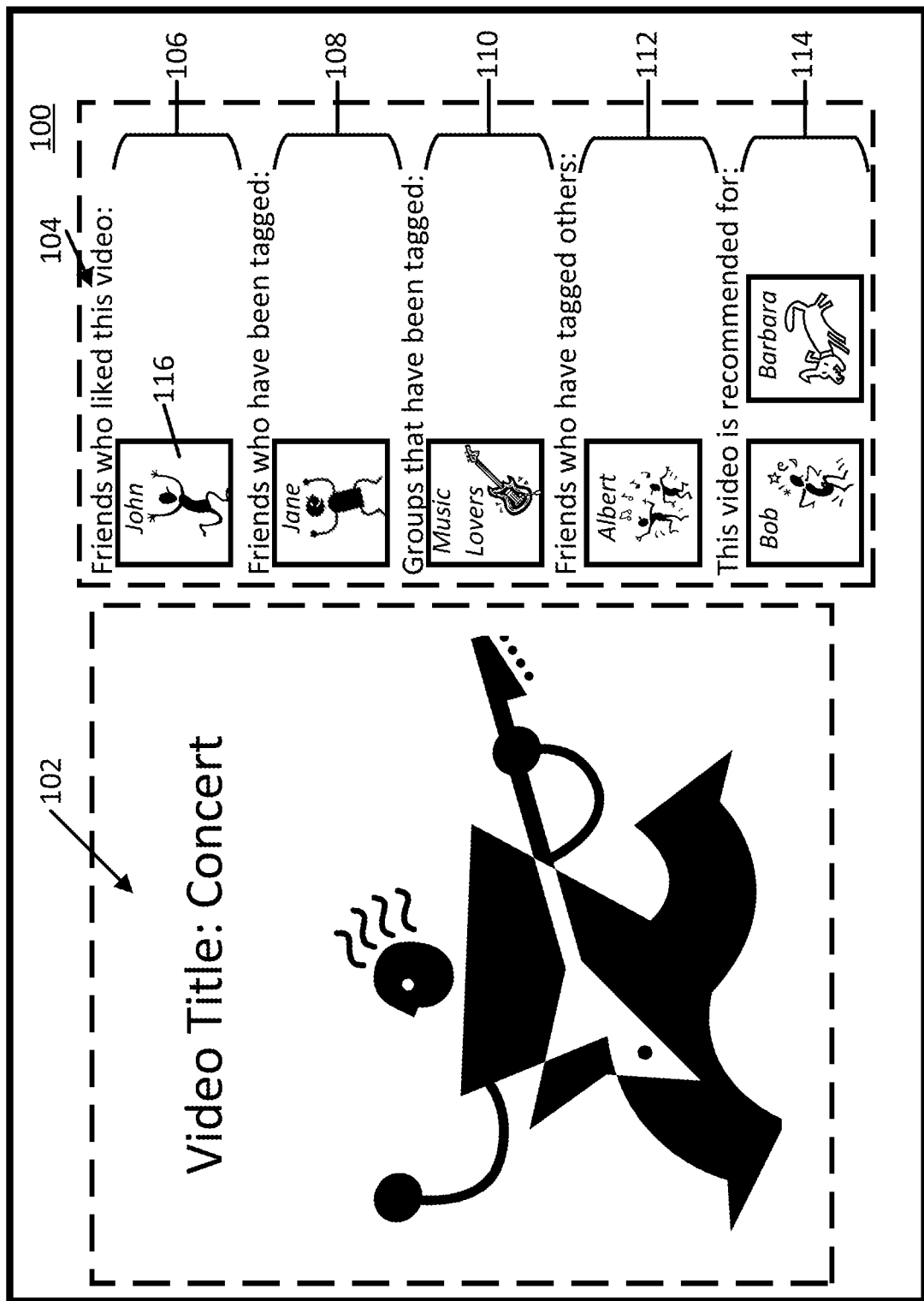
FIG. 1 shows an example of a user interface for indicating viewership of a video in accordance with some embodiments of the disclosed subject matter.

In accordance with various embodiments, mechanisms (which can include methods, systems, and media) for indicating viewership of a video are provided.

In some embodiments, the mechanisms described herein can cause indications of viewers who have previously viewed, endorsed, shared, and/or received suggestions to view a particular video to be presented to a first user who is browsing a list of videos. In some embodiments, the viewers can correspond to connections of the first user, such as those who are directly connected to the first user on a social networking service, belong to the same group on a social networking service, and/or have any other suitable connection to the first user. In some embodiments, the indications can include a name of the viewer and/or an image representing the viewer, and the indications can be presented in connection with an identifier of the particular video, thereby allowing the first user browsing the list of videos to quickly identify friends who have watched and/or endorsed the video.

In some embodiments, the indications can be presented as belonging to different categories. For example, in some embodiments, the categories can include: users that have endorsed a video, users that have received suggestions to view the video, groups the first user belongs to that have received a suggestion to view the video, users that have suggested that other users view the video, and/or friends that have been identified as likely to enjoy the video. In some such embodiments, viewer indicators can be displayed in any suitable manner that indicates which category the corresponding viewer belongs to. Additionally, in some embodiments, the mechanisms described herein can cause a user included in one category to be removed from the other categories.

In some embodiments, the mechanisms described herein can identify users corresponding to the viewership indicators and store indications of the identified users for later use, as shown in and described below in connection with FIG. 6. For example, in some embodiments, the mechanisms can identify the users corresponding to the different categories of viewership indicators for a particular video and can store the user identifiers (e.g., in a cache on a server), and the user identifiers can then be retrieved at a later time, for example, in response to a request from a user device to present a page that includes an indication of the video (e.g., a list of videos that includes the video, a page that includes a thumbnail image associated with the video, and/or any other suitable indication of the video). In some embodiments, the mechanisms can identify users based on interactions with content that are shared by the users publicly. For example, in some embodiments, the mechanisms can identify a user's interactions with content while signed in to a particular user account. Additionally, in instances where the mechanisms do not identify any users, the mechanisms can cause the viewership indicators to be omitted from presentation.

Note that, although the mechanisms described herein relate to indicating viewership of a video, in some embodiments, the mechanisms can be used to indicate viewership of any suitable type of media content, such as audio content (e.g., music, radio programs, audiobooks, and/or any other suitable type of audio content), television programs, movies, live streaming media content, electronic books, and/or any other suitable type of media content.

Turning to FIG. 1, an example 100 of a user interface for indicating viewership of a video is shown in accordance with some embodiments of the disclosed subject matter. As illustrated, user interface 100 can include video indicator 102 and a panel of user indicators 104.

Video indicator 102 can be related to any suitable video. For example, in some embodiments, video indicator 102 can include an icon and/or title of a video from a list and/or group of videos that a user is browsing. As a more particular example, in some embodiments, video indicator 102 can be a thumbnail image associated with the video. As shown in user interface 102, in some embodiments, video indicator 102 can include any suitable images, icons, graphics, animations, hyperlinks, titles, and/or any other suitable content. For example, in some embodiments, video indicator 102 can include a title of the video, a creator of the video, and/or any other suitable information.

Panel 104 can indicate users who have watched the video corresponding to video indicator 102, users who have endorsed and/or liked the video, users who have received suggestions to watch the video, users who have recommended the video to others, and/or users that have been identified as likely to enjoy the video. In some embodiments, the users indicated in panel 104 can be connections of a first user browsing a list of videos. For example, in some embodiments, the indicated users can be a direct connection of the first user on a social networking service (e.g., friends of the first user, and/or any other suitable type of direct connection) or an indirect connection of the first user on the social networking service (e.g., a friend of a friend, and/or any other suitable type of indirect connection). As another example, in some embodiments, the users indicated in panel 104 and the first user browsing the list of videos can belong to a group on a social networking service, have subscribed to a channel of media content, and/or have indicated interest in a similar topic.

As shown in panel 104, users indicated in panel 104 can be subdivided into different categories, each of which indicates a different type of interest in the video. For example, in some embodiments, the categories can include: users who endorsed the video (e.g., by "liking" the video, commenting on the video, and/or any other suitable type of endorsement, users who have received suggestions to view the video (e.g., by another user sharing the video and/or a link to the video, and/or in any other suitable manner), groups of users that have received suggestions to view the video (e.g., due to the video being posted on a page corresponding to the group, due to the video being sent to all members of the group, and/or in any other suitable manner), users who have shared the video with other users, and users who have been identified as likely to enjoy the video. In some embodiments, each category can be grouped in any suitable manner, as shown in user interface 100 by groups 106, 108, 110, 112, and 114. In some embodiments, users who appear in one category can be inhibited from appearing in any other category in panel 104, as described below in connection with FIGS. 4 and 5. In some embodiments, any suitable visual indicator can be used to separate categories within panel 104, such as a line between categories, a box around each category, and/or any other suitable visual indicator. Alternatively, in some embodiments, a visual indicator to separate categories within panel 104 can be omitted. Note that, although five categories are shown in panel 104 and are described herein, in some embodiments, any suitable number (e.g., one, two, four, ten, and/or any other suitable number) of categories can be included.

Users and/or groups indicated in panel 104 can be indicated with an icon, a name, and/or any other suitable information, as shown by user indicator 116 in user interface 100. For example, in some embodiments, user indicator 116 can include a name of the user. As another example, in some embodiments, user indicator 116 can include an image and/or icon representing the user. Note that, in some embodiments, indicators corresponding to different groups can be presented in different manners. For example, in some embodiments, indicators corresponding to a group of users who have been identified as likely to enjoy the video can be presented with a different color scheme (e.g., in black and white, using transparency, and/or any other suitable color scheme) compared to indicators corresponding to a group of users who have endorsed the video. In some embodiments, user indicator 116 can include any other suitable information, such as an indication of whether the user is currently active on a site associated with user interface 100, an icon indicating a social networking platform from which the user shared and/or endorsed a content item, and/or any other suitable information. Note that, in some embodiments, selection of user indicator 116 can cause any suitable action to occur. For example, in some embodiments, selection of user indicator 116 can cause a profile page associated with the user and/or group to be presented. As another example, in some embodiments, selection of an icon indicating a social networking platform on which the video was shared can cause a browser window presenting user interface 100 to navigate to a page presenting a post in which the video was shared.

Note that user interface is shown as an example of a user interface for presenting viewership indicators, and in some embodiments, the viewership indicators can be presented in any other suitable manner. For example, in some embodiments, user indicators can be presented without an indication of a category to which the corresponding user belongs. As a more particular example, in some embodiments, user indicators from multiple categories (e.g., friends who liked the video, friends who have tagged others to view the video, and/or any other categories) can be presented within panel 104 without text indicating each group.

Figure 2:
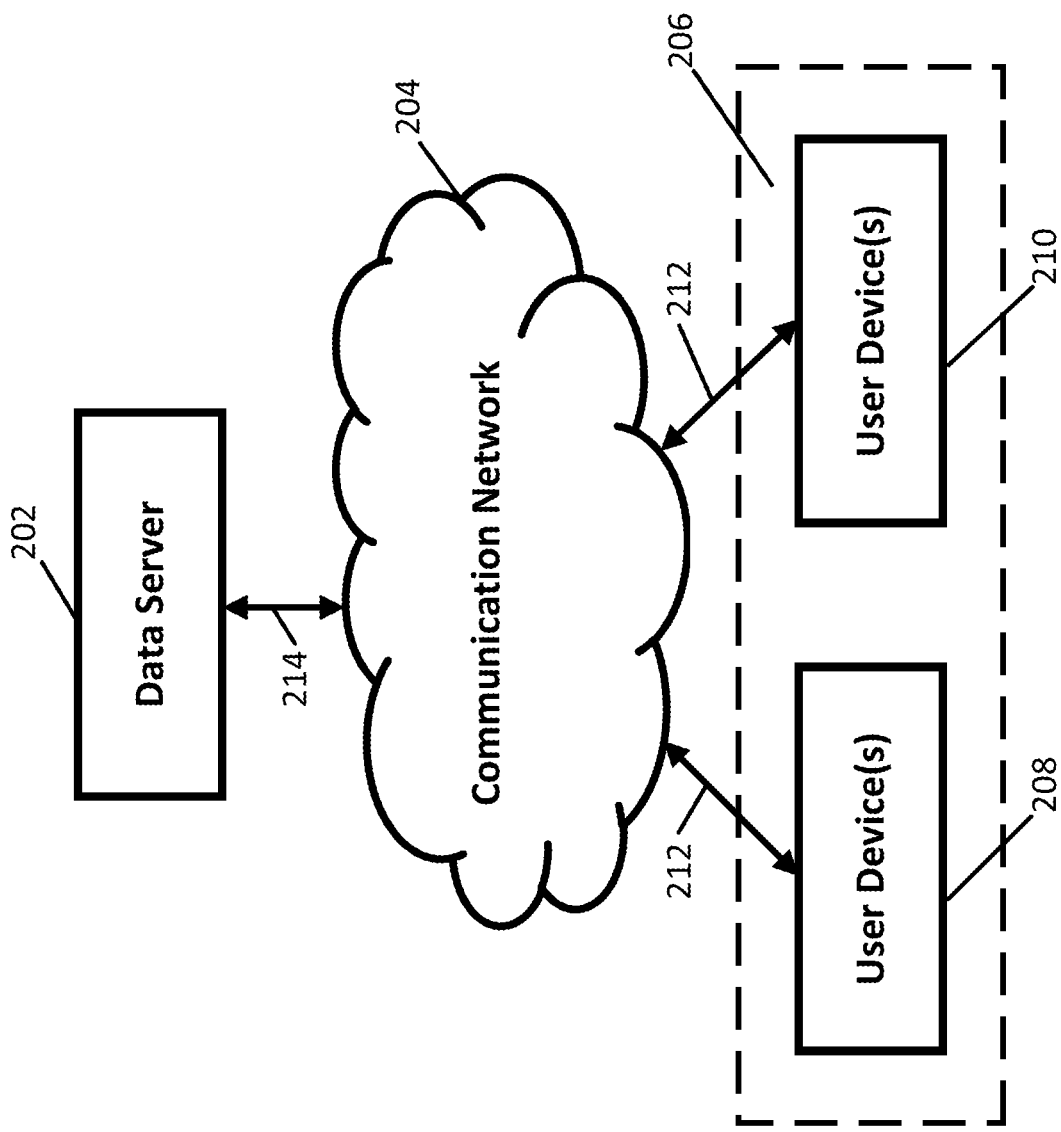
FIG. 2 shows a schematic diagram of an illustrative system suitable for implementation of mechanisms described herein for indicating viewership of a video in accordance with some embodiments of the disclosed subject matter.

Turning to FIG. 2, an example 200 of hardware for indicating viewership of a video that can be used in accordance with some embodiments of the disclosed subject matter is shown. As illustrated, hardware 200 can include one or more servers such as a data server 202, a communication network 204, and/or one or more user devices 206, such as user devices 208 and 210.

In some embodiments, data server 202 can be any suitable server for storing information relating to users who have viewed a video, users who have endorsed a video, users who have tagged a connection to view a video, and/or any other suitable information. In some embodiments, data server 202 can use the stored information to create indications of users who have viewed, endorsed, and/or recommended a particular video. For example, in some embodiments, the indications can be presented to a first user, for example, if the first user is browsing a list of videos. In some such embodiments, the users who have viewed, endorsed, and/or recommended the particular video can be friends of the first user. In some embodiments, data server 202 can additionally maintain any suitable lists and/or graphs of relationships between users that can be used to create the indications of users who have viewed, endorsed, and/or recommended the video. In some embodiments, data server 202 can identify users corresponding to the viewership indicators at a first time and can store indications of the identified users for presentation at any suitable later time, as shown in and described below in connection with FIG. 6. In some embodiments, data server 202 can be omitted.

Communication network 204 can be any suitable combination of one or more wired and/or wireless networks in some embodiments. For example, communication network 206 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links 212 to communication network 204 that can be linked via one or more communications links (e.g., communications link 214) to data server 202. Communications links 212 and/or 214 can be any communications links suitable for communicating data among user devices 206 and server 202 such as network links, dial-up links, wireless links, hard-wired links, any other suitable communications links, or any suitable combination of such links.

In some embodiments, user devices 206 can include one or more computing devices suitable for browsing a listing of videos, viewing a video, recommending a video, endorsing a video, suggesting a video to another user, and/or any other suitable functions. For example, in some embodiments, user devices 206 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 206 can be implemented as a non-mobile device such as a desktop computer, a set-top box, a television, a streaming media player, a game console, and/or any other suitable non-mobile device.

Although data server 202 is illustrated as a single device, the functions performed by data server 202 can be performed using any suitable number of devices in some embodiments. For example, in some embodiments, the functions performed by data server 202 can be performed on a single server. As another example, in some embodiments, multiple devices can be used to implement the functions performed by data server 202.

Although two user devices 208 and 210 are shown in FIG. 2, any suitable number of user devices, and/or any suitable types of user devices, can be used in some embodiments.

Figure 3:
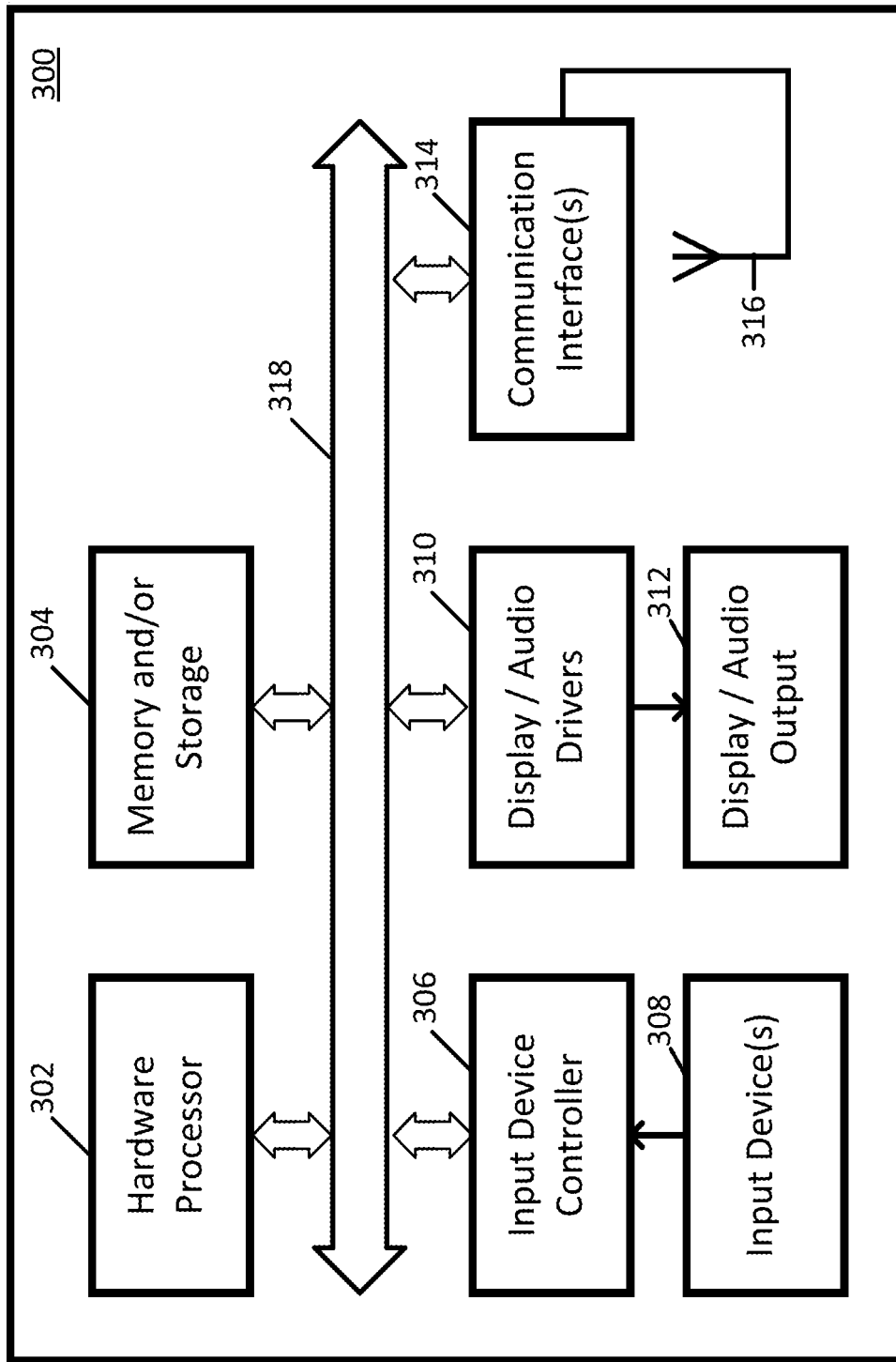
FIG. 3 shows a detailed example of hardware that can be used in a server and/or a user device of FIG. 2 in accordance with some embodiments of the disclosed subject matter.

Data server 202 and user devices 206 can be implemented using any suitable hardware in some embodiments. For example, in some embodiments, devices 202 and 206 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as server 202). For example, the server program can cause hardware processor 302 to store indications of users who have viewed, endorsed, and/or recommended a video, present an indication of connections of a user who have viewed, endorsed, and/or recommended the video, and/or perform any other suitable actions. In some embodiments, hardware processor 302 can be controlled by a computer program stored in memory and/or storage 304 of user device 206. For example, the computer program can cause hardware processor 302 to present indications of users who have viewed, endorsed, and/or recommended a video, and/or perform any other suitable actions.

Memory and/or storage 304 can be any suitable memory and/or storage for storing programs, data, media content, advertisements, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
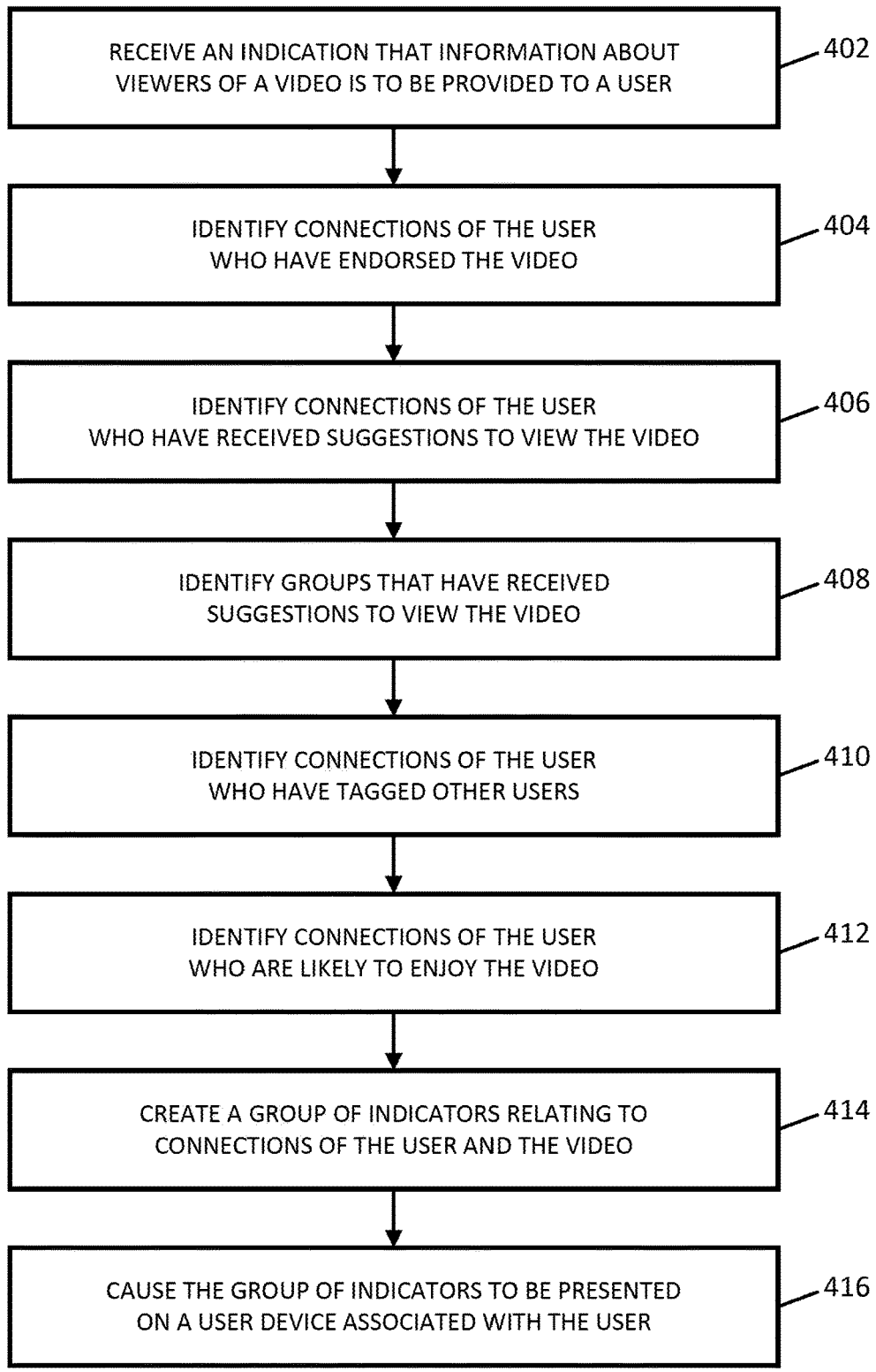
FIG. 4 shows an example of a process for indicating viewership of a video in accordance with some embodiments of the disclosed subject matter.

Turning to FIG. 4, an example 400 of a process for indicating viewership of a video is shown in accordance with some embodiments of the disclosed subject matter. In some embodiments, blocks of process 400 can be executed on data server 202 and/or user device 206.

Process 400 can begin by receiving an indication that viewership information is to be provided to a user at 402. Process 400 can receive the indication in response to any action and/or information. For example, in some embodiments, process 400 can receive the indication in response to determining that a particular page is to be presented. As a more particular example, in some embodiments, the particular page can correspond to a home page of a video sharing service, a home page corresponding to a user account associated with the user for a video sharing service, a page associated with a particular channel of media content on a video sharing service, and/or any other suitable type of page. As another example, in some embodiments, process 400 can receive the indication in response to determining that a first user is browsing a listing of videos, and can determine that information about a particular video in the listing is to be provided (e.g., by determining that the user has selected the particular video, by determining that a cursor is hovering over an icon associated with the particular video, and/or based on any other suitable information). As described above in connection with FIG. 1, in some embodiments, the viewers of the video can be restricted to direct and/or indirect connections (e.g., on a social networking service) of the first user.

Process 400 can identify connections (direct and/or indirect) of the user who have endorsed the video at 404. For example, in some embodiments, process 400 can identify connections of the user who have indicated that they watched and liked the video, and/or endorsed the video in any other suitable manner. Process 400 can use any suitable technique or combination of techniques to identify the connections of the user. For example, in some embodiments, process 400 can query a database (e.g., on data server 202) for users who have both endorsed the video and are connected to the first user. In some such embodiments, process 400 can specify any suitable level of connection. For example, in some embodiments, process 400 can identify only users who are directly connected to the first user, users who are connected by less than a predetermined degree of separation, and/or based on any other suitable criteria. Alternatively, in some embodiments, process 400 can identify users who belong to a particular group with the first user and/or who have subscribed to a channel of a media content with the first user. Note that, in some embodiments, the connections identified at block 404 can correspond to the users displayed in category 106 as shown in and described above in connection with FIG. 1. A more particular example of a process for identifying connections of the user who have endorsed the video is shown in and described below in connection with FIG. 6.

Note that, in some embodiments, process 400 can additionally or alternatively identify groups that have endorsed the channel of media content or the video. For example, in some embodiments, the groups can include a group on a social networking service, channels of media content available on a video sharing service, and/or any other suitable type of group(s).

Process 400 can identify connections of the first user who have received suggestions to view the video at 406. In some embodiments, the identified users can be those who have received a message with a link to the video, users who have had the video posted on a profile page on a social networking service by another user, and/or received a suggestion to view the video in any other suitable manner. As described above, the identified users can be connected to the first user directly or indirectly in any suitable manner. Similarly to at block 404, the users can be identified using any suitable techniques, for example, by querying a database. Note that, in some embodiments, the connections identified at block 406 can correspond to the users displayed in category 108 as shown in and described above in connection with FIG. 1.

Process 400 can identify groups that have received suggestions to view the video at 408. In some embodiments, the identified groups can be ones that the first user belongs to. For example, in some embodiments, the groups can include those that the user has joined on a social networking service, groups that correspond to users who have subscribed to a particular channel of media content, and/or any other suitable groups. Similarly to at blocks 404 and 406, the groups can be identified using any suitable techniques, for example, by querying a database. Note that, in some embodiments, the groups identified at block 408 can correspond to the group(s) displayed in category 110 as shown in and described above in connection with FIG. 1.

Process 400 can identify connections of the first user who have shared the video with other users at 410. For example, in some embodiments, the identified connections can include those who have sent a message to another user that includes the video and/or a link to the video, those who have posted the video and/or a link to the video on a page associated with another user, and/or those who have shared the video in any other suitable manner. Similarly to at blocks 404-408, the users can be identified using any suitable techniques, for example, by querying a database. Note that, in some embodiments, the users identified at block 410 can correspond to the users displayed in category 112 as shown in and described above in connection with FIG. 1.

Process 400 can identify connections of the first user who are likely to enjoy the video at 412 based on any suitable information. For example, in some embodiments, process 400 can identify users connected to the first user who have endorsed similar videos. As a more particular example, if the video relates to a particular topic, process 400 can identify connections of the user who have previously endorsed videos related to the topic. As another example, in some embodiments, process 400 can identify users connected to the first user who are interested in a topic associated with the video. In some such embodiments, the users can be identified based on collections of video content the user has subscribed to and/or otherwise endorsed, interests indicated on a social networking service, and/or using any other suitable information. As yet another example, in some embodiments, process 400 can identify users connected to the first user who have endorsed videos determined to be similar to videos viewed by the first user. In some such embodiments, similarity can be determined using any suitable information, such as metadata indicating topics of the videos, creators of the videos, and/or any other suitable information. Note that, in some embodiments, the users identified at block 412 can correspond to the users displayed in category 114 as shown in and described above in connection with FIG. 1.

Process 400 can create one or more groups of indicators relating to the connections and groups identified in blocks 404-412 at 414. For example, as shown in and described above in connection with FIG. 1, the group of indicators can include those presented in panel 104 of user interface 100. As shown in and described above in connection with FIG. 1, each group of indicators can correspond to a category (e.g., users that have endorsed content, users that have tagged another user to view content, users determined to be likely to enjoy the content, and/or any other suitable categories, as described above). Additionally, each group of indicators can include any suitable number of user indicators, as shown in panel 104 of FIG. 1. Similarly to user indicator 116 in FIG. 1, each indicator can include a name of the user and/or group, an icon and/or image representing the user and/or group, and/or any other suitable information. Note that, in some embodiments, any suitable number of indicators can be created. For example, in some embodiments, an indicator corresponding to each identified connection and/or group can be created. Additionally or alternatively, in some embodiments, indicators corresponding to a subset of the identified connections and/or groups can be created. In some such embodiments, process 400 can identify any suitable subset. For example, in some embodiments, process 400 can identify users and/or groups based on a level of interaction with the first user (e.g., users and/or groups the first user has most recently interacted with, users and/or groups the first user has interacted with the most number of times, and/or any other suitable metric), and/or based on any other suitable criteria. In some embodiments, each category represented in panel 104 can include a different number of user indicators, and any suitable number of indicators can be included in each category.

Note that, in some embodiments, process 400 can deduplicate users represented in multiple categories. For example, if a particular user has both endorsed the video and has shared the video with other users, process 400 can remove the user from one of the two categories. In some embodiments, inclusion in categories can be ranked and/or ordered. For example, in some embodiments, the ordering of categories can be: users who have endorsed a video, users who have received suggestions to view the video, groups which have received suggestions to view the video, users who have shared the video with others, and users who have been identified as likely to enjoy the video. In some embodiments, users that can belong to more than one category can be placed in the highest-ranking category and removed from all other categories. A process for modifying a category that a user belongs to is shown in and described below in connection with FIG. 5.

Process 400 can cause the group of indicators to be presented on a user device associated with the first user at 416. For example, as shown in and described above in connection with FIG. 1, process 400 can cause the group of indicators to be presented in connection with an indicator (e.g., a thumbnail image associated with the video, and/or any other suitable indicator) of the video. As another example, in some embodiments, the groups of indicators can be grouped into multiple categories, as shown in panel 104 of FIG. 1.

Figure 5:
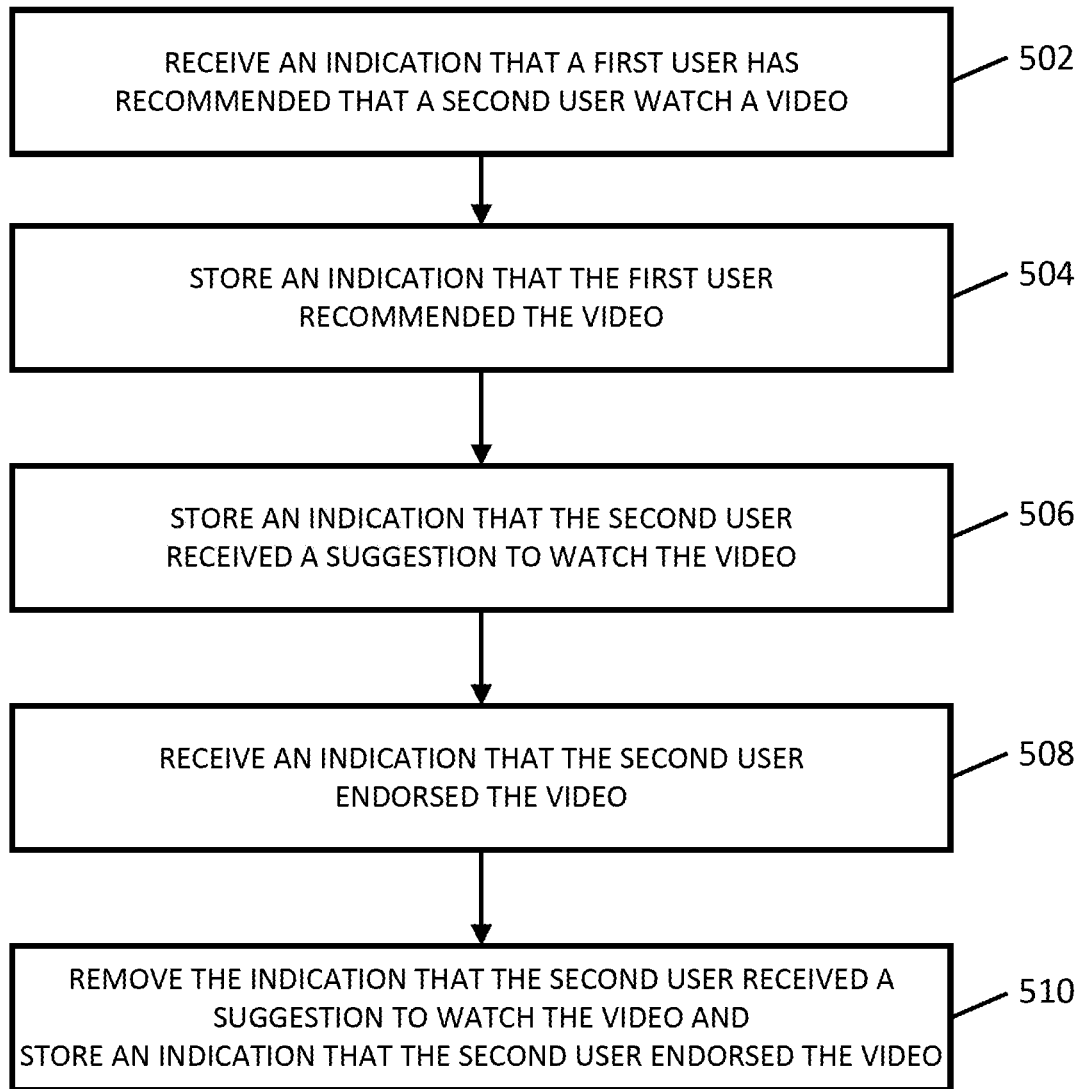
FIG. 5 shows an example of a process for storing indications of viewership of a video in accordance with some embodiments of the disclosed subject matter.

Turning to FIG. 5, an example 500 of a process for storing indications of viewership of a video is shown in accordance with some embodiments of the disclosed subject matter. Note that although process 500 describes storing indications of users sharing a video and endorsing a video, the techniques described below can be applied to any suitable actions. In some embodiments, blocks of process 500 can be executed by data server 202.

Process 500 can begin by receiving an indication that a first user has recommended that a second user watch a video at 502. As described above in connection with FIGS. 1 and 4, the first user and the second user can be connected in any suitable manner (e.g., a direct connection on a social networking service, an indirect connection on a social networking service, both belong to a particular group on a social networking service, both have subscribed to media content associated with a particular channel, and/or any other suitable type of connection). The recommendation can be made in any suitable manner. For example, in some embodiments, the first user can send the second user a message that includes a link to the video.

Process 500 can store an indication that the first user recommended and/or shared the video at 504. In some embodiments, the indication can be stored in any suitable location (e.g., in memory 304 of data server 202) and using any suitable techniques. For example, in some embodiments, the indication can be stored in a database with an identifier associated with the first user as a key. In some embodiments, the stored indication can cause the first user to be identified by process 400 at block 410 (e.g., to identify users that have shared a video with other users).

Process 500 can store an indication that the second user has received a suggestion to view the video at 506. Similarly to at block 504, the indication can be stored in any suitable location using any suitable techniques, such as in a database in data server 202. In some embodiments, the stored indication can cause the second user to be identified by process 400 at block 406 (e.g., to identify users that have received a suggestion to view the video).

Process 500 can receive an indication that the second user has endorsed the video at 508. For example, in some embodiments, process 500 can receive information indicating that the second user selected a link associated with the video and, after presentation of the video, indicated that they enjoyed the video (e.g., by selecting an icon indicating that they liked the video) and/or endorsed the video in any suitable manner.

Process 500 can store an indication that the second user endorsed the video at 510. Similarly to blocks 504 and 506, the indication can be stored in any suitable location using any suitable techniques, such as in a database in data server 202. In some embodiments, the stored indication can cause the second user to be identified by process 400 at block 404 (e.g., to identify users that have endorsed the video). Process 500 can additionally remove the indication stored at block 506 that indicates that the second user received the suggestion to view the video in any suitable manner. For example, in some embodiments, process 500 can change a flag setting associated with the second user that indicates whether the second user received a suggestion to view the video.

Note that, in some embodiments, process 500 can store indications for a particular user to ensure that only a predetermined number of indications have been stored for that user. For example, in some embodiments, if an indication that a user has endorsed a particular video has been stored, process 500 can remove indications that the user was likely to enjoy the video, that the user received a suggestion to view the video, and/or any other suitable indications. In some embodiments, process 500 can prioritize indications in any suitable order, for example, by prioritizing an indication that the user endorsed the video over an indication that the user received a suggestion to view the video, that the user is likely to enjoy the video, and/or that the user suggested the video to another user. In some embodiments, removing and/or deleting multiple indications can be used to deduplicate categories of video viewership to ensure that a particular user is included in only one category. Additionally, note that in some embodiments, process 500 can store an indication that a user has disliked a video. In some such embodiments, process 500 can then remove any other indications related to the user and the video and can cause the user to not appear in a group of indicators of viewership. Furthermore, in some embodiments, process 500 can receive an indication that a user that has been tagged to view a video has removed the tag (e.g., by deleting their name from the tag, deleting a comment or post in which they were tagged, and/or in any other suitable manner), and in response, process 500 can remove and/or delete a stored indication that the user was tagged to view the video.

Figure 6:
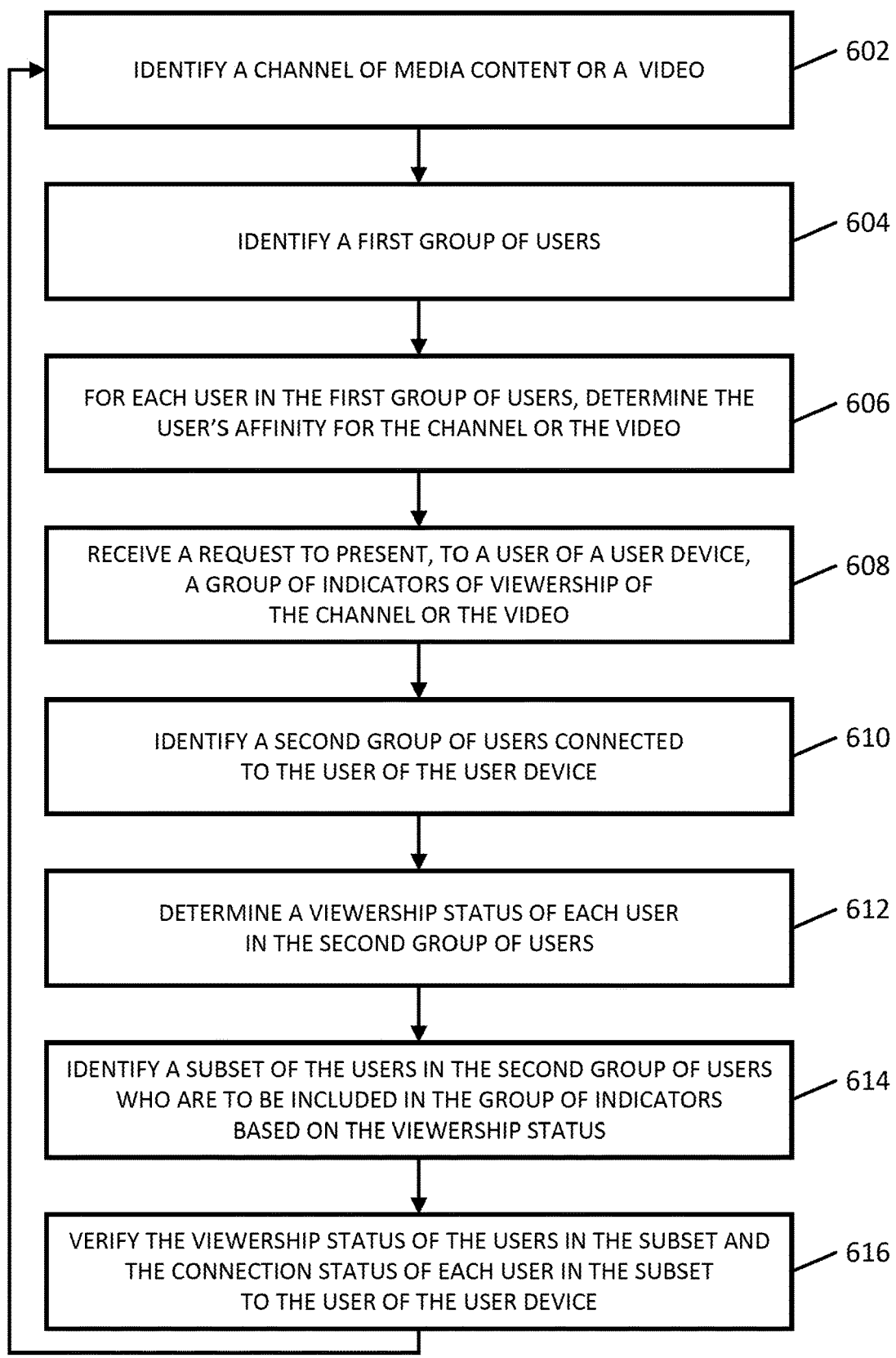
FIG. 6 shows an example of a process for identifying users to be included in a group of indicators of viewership of a channel of media content and/or a media content item.

Turning to FIG. 6, an example 600 of a process for identifying, for a particular channel of media content and/or a particular video, a group of users to be included in a group of indicators of viewership of the particular channel of media content and/or video is shown in accordance with some embodiments of the disclosed subject matter.

Process 600 can begin by identifying a particular channel of media content and/or a particular video at 602 for which indicators of viewership are to be presented. Process 600 can identify the channel of media content and/or the video using any suitable technique(s) and based on any suitable information. For example, in some embodiments, the channel of media content and/or the video can be one included in a video service home page presented to a particular user authenticated with a corresponding user account. As a more particular example, in some embodiments, the channel of media content can include a channel that the user has subscribed to, a channel that is recommended for the user based on interests the user has indicated (e.g., in one or more posts on a social networking site, a profile associated with the user, and/or indicated in any other suitable manner), and/or any other suitable channels. As another more particular example, in some embodiments, the particular video can be one that is recommended for the user based on previously endorsed content, a video that has been determined to be a currently popular video (e.g., has received more than a predetermined number of views within a recent time period, and/or identified using any other suitable popularity metrics), and/or any other suitable video.

Process 600 can identify a first group of users at 604. The first group of users can include any suitable users, such as those that are associated with user accounts on a particular video sharing service, those that are associated with user accounts on a particular social networking service, and/or any other suitable users. In some embodiments, consent can be requested from users to be included in the first group of users, for example, as part of settings associated with a user account.

At 606, for each user in the first group of users, process 600 can determine an affinity score for the user and the channel of media content and/or the video. Process 600 can determine the affinity score based on any suitable information and using any suitable technique(s). For example, in some embodiments, the affinity score can be based on whether the user has viewed content produced by the channel of media content, has endorsed (e.g., indicated that they enjoyed) content produced by the channel of media content, has endorsed the video, has shared content produced by the channel of media content (e.g., in a social networking post), has shared the video (e.g., in a social networking post), has subscribed to the channel of media content, has commented on the video, and/or has interacted with the channel of media content or the video in any other suitable manner. In instances where the user has interacted with the channel of media content or the video in multiple instances (e.g., commented on the video and endorsed the video), process 600 can weigh the interactions in any suitable manner to calculate the affinity score based on the multiple interactions. For example, in some embodiments, endorsements can be weighed more heavily than viewing content, sharing content can be weighed more heavily than commenting on content, etc. Note that, in some embodiments, multiple affinity scores can be calculated for each of multiple types of interaction, and, in some such embodiments, each affinity score can be a Boolean value. For example, in some embodiments, an affinity score indicating whether the user has endorsed content associated with the channel of media content or the video can be a Boolean value, where a value of "true" indicates that the user has endorsed the content and a value of "false" indicates that the user has not endorsed the content. Process 600 can store the affinity score(s) in any suitable location, for example, in memory 304 of data server 202. As a more particular example, in some embodiments, the affinity score(s) can be stored in a cache within memory 304 of data server 202. In some such embodiments, the affinity score(s) can be stored in the cache for any suitable time period (e.g., a day, a week, a month, and/or any other suitable time period).

Note that, in some embodiments, blocks 602-606 can be repeated for multiple channels of media content and/or videos, and the affinity scores for the multiple channels or videos and groups of users can be stored for later use, for example, on data server 202.

At 608, process 600 can receive a request to present, to a user of a user device, groups of viewership indicators corresponding to the channel of media content or the video. Process 600 can receive the request based on any suitable action(s). For example, in some embodiments, process 600 can receive the request in response to a determination that the user has navigated to a particular page on the user device. As a more particular example, the page can include a home page corresponding to a user account of the user on a video sharing service or social networking service, a page corresponding to a particular channel of media content or a particular video (e.g., the channel of media content or the video described above in connection with block 602), and/or any other suitable page. Note that, in some embodiments, process 600 may not receive a request to present the group of viewership indicators. In some such embodiments, process 600 may identify the groups of viewership indicators and may store the identified groups of viewership indicators to be presented to the user at a later time.

Process 600 can identify a second group of users connected to the user of the user device at 610. As described above in connection with FIGS. 4 and 5, each user in the second group of users can be connected to the user of the user device directly or indirectly. For example, in some embodiments, users who are directly connected may be direct connections on any suitable social networking service, have directly exchanged messages through any suitable communication interface (e.g., an instant messaging interface, e-mail, and/or any other suitable communication interface), and/or be directly connected in any other suitable manner. As another example, users who are indirectly connected may both belong to the same group on a social networking service, both be subscribed to the same channel of media content on a video sharing service, have a direct connection in common with both users, and/or be indirectly connected in any other suitable manner. Process 600 can identify the second group of users connected to the user of the user device using any suitable technique or combination of techniques. For example, in some embodiments, process 600 can identify direct connections of the user on multiple networking platforms (e.g., one or more communication interfaces, social networking services, video sharing services, and/or any other suitable networking platforms). As another example, in some embodiments, process 600 can identify indirect connections and/or suggested connections by identifying groups the user of the user device belongs to, connections separated from the user of the user device by any suitable degree on a networking platform, and/or based on any other suitable information.

Process 600 can determine a viewership status corresponding to the channel of media content or the video for each user in the second group of users at 612. In some embodiments, the viewership status can indicate that the user belongs to a particular category. For example, in some embodiments, the categories can include users that have endorsed the channel of media content or video, users that have not watched content from the channel of media content or have not watched the video but are likely to enjoy the content, and users that do not belong to either of the previous categories. Alternatively, in some embodiments, the viewership status can include any other suitable categories, such as users that have been tagged by another user to view the content, users that have viewed the content but not endorsed the content, users that have shared the content on a social networking service, and/or any other suitable categories. In some embodiments, the categories can correspond to those shown in and described above in connection with panel 104 of FIG. 1 and blocks 404-412 of FIG. 4. Note that, in some embodiments, the viewership status of a particular user corresponding to a particular channel of media content or particular video can be determined based on the user's interactions with the content that are publically available. For example, in some embodiments, process 600 can determine the viewership status for each user and content combination based on interactions that occurred with the content while the user was signed in to a user account. In some embodiments, permission can be requested from the user to store and/or use any information relating to the user's interactions with content.

At 614, process 600 can identify a subset of the second group of users who are to be included in the group of viewership indicators based on the viewership status determined at block 612. Process 600 can identify the subset using any suitable techniques. For example, in some embodiments, process 600 can first determine a number of categories of viewership indicators to be presented (e.g., as shown in and described above in connection with FIG. 1), and can then identify a subset of users corresponding to each of the categories. As a more particular example, in instances where process 600 determines that the categories are to include users who have endorsed the channel of media content or the video and users that would likely enjoy the channel of media content or video, process 600 can then identify, based on the viewership status, users corresponding to each of the two categories. In some embodiments, process 600 can identify any suitable number (e.g., one, two, five, ten, twenty, and/or any other suitable number) of users in each category. In instances where more users belong to each category than are to be indicated in the group of viewership indicators, process 600 can select the users in the subset based on any suitable criteria. For example, in some embodiments, process 600 can select the users in the subset based on an affinity score and/or a score indicating a strength of a relationship between the user in the subset of users and the user to be presented with the viewership indicators. For example, in some embodiments, process 600 can sort the users in the subset based on the strength of their relationship with the user to be presented with the viewership indicators, and can select the top N (e.g., one, two, five, ten, twenty, and/or any other suitable number) users in each category. In some embodiments, process 600 can use any suitable information and/or technique(s) to determine a strength of the relationship, for example, a number of interactions between the two users (e.g., number of messages sent, number of comments on posts on a social networking service, and/or any other suitable communication), a frequency of interaction, and/or any other suitable metric.

In some embodiments, process 600 can cause the group of viewership indicators to be presented (e.g., as described above in connection with FIGS. 1 and 4) based on the identified subset of the second group of users. Additionally or alternatively, in some embodiments, process 600 can store the identified subset of users for presentation on the user device at a later time. For example, in some embodiments, the subset of users can be identified and stored in a cache in memory 304 of data server 202, and process 600 can cause the corresponding viewership indicators to be presented at a later time, for example, in response to a request from the user device (e.g., a request for a particular page, and/or any other suitable request).

In instances where process 600 stored the identified subset of users, process 600 can verify the viewership status of each user in the subset of users and the connection status of each user in the subset of users to a user of the user device at 616.

For example, in some embodiments, process 600 can verify that users who were identified as having endorsed the channel of media content and/or the video have not retracted and/or modified their endorsement in the time since they were identified. As another example, in some embodiments, process 600 can verify that users who were identified as likely to enjoy the video have not viewed the video in the time since they were identified. As yet another example, in some embodiments, process 600 can verify that users who were identified as a direct connection of the user of the user device have not modified their connection status (e.g., retracted a friendship status on a social networking service, and/or modified a connection status in any other suitable manner) in the time since they were identified.

In some embodiments, process 600 can loop back to block 602 and can identify a second channel of media content or a second video. For example, in some embodiments, process 600 can loop through a list of channels and/or videos for which viewership indicators are to be created, and can store information relating to the viewership indicators (e.g., as described in blocks 606 and 612). The stored information can then be retrieved at any suitable later time, for example, in response to receiving a request to present a page on which the viewership indicators are to be presented.

In some embodiments, at least some of the above described blocks of the processes of FIGS. 4, 5, and 6 can be executed or performed in any order or sequence not limited to the order and sequence shown in and described in connection with the figures. Also, some of the above blocks of FIGS. 4, 5, and 6 can be executed or performed substantially simultaneously where appropriate or in parallel to reduce latency and processing times. Additionally or alternatively, some of the above described blocks of the processes of FIGS. 4, 5, and 6 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for indicating viewership of a video are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for indicating media viewership, the method comprising:
identifying a media content item based at least in part on a viewing history of a first user associated with a user device;
receiving a request to present a page that includes a representation of the media content item;
determining, for the media content item, a viewership status of users in a group of users connected to the first user, wherein the viewership status corresponds to one of a different level of engagement with the media content item;
causing the requested page to be presented on the user device, wherein the requested page includes a first portion that includes the representation of the media content item and a second portion that indicates viewership information corresponding to the media content item, wherein the second portion includes a plurality of groups of indicators each corresponding to a different level of engagement with the media content item, wherein each indicator in the group of indicators represents the viewership status of the user and corresponds to a user in the group of users.

2. The method of claim 1, wherein the group of users are identified based on a strength of a connection between the first user and users in the group of users.

3. The method of claim 1, wherein a level of engagement corresponds to users in the group of users who have not yet watched the media content item and are determined as likely to enjoy the media content item.

4. The method of claim 1, further comprising identifying a subset of users in the group of users based at least in part on the viewership status, wherein the subset of users in the group of users is identified based on an affinity of each user in the subset of users for the media content item.

5. The method of claim 4, wherein the affinity of each user in the subset of users for the media content item is determined based on whether each user has interacted with the media content item.

6. The method of claim 5, wherein determining the affinity comprises:
determining that a user in the subset of users has interacted with the media content item via multiple interactions; and
applying a weight to each type of interaction of the multiple interactions, wherein the affinity of the user in the subset of users is based on the weight of each type of interaction of the multiple interactions.

7. The method of claim 1, wherein a user included in a first group of indicators is inhibited from inclusion in a second group of indicators.

8. A system for indicating media viewership, the system comprising:
a hardware processor that is configured to:
identify a media content item based at least in part on a viewing history of a first user associated with a user device;
receive a request to present a page that includes a representation of the media content item;
determine, for the media content item, a viewership status of users in a group of users connected to the first user, wherein the viewership status corresponds to one of a different level of engagement with the media content item;
cause the requested page to be presented on the user device, wherein the requested page includes a first portion that includes the representation of the media content item and a second portion that indicates viewership information corresponding to the media content item, wherein the second portion includes a plurality of groups of indicators each corresponding to a different level of engagement with the media content item, wherein each indicator in the group of indicators represents the viewership status of the user and corresponds to a user in the group of users.

9. The system of claim 8, wherein the group of users are identified based on a strength of a connection between the first user and users in the group of users.

10. The system of claim 8, wherein a level of engagement corresponds to users in the group of users who have not yet watched the media content item and are determined as likely to enjoy the media content item.

11. The system of claim 8, wherein the hardware processor is further configured to identify a subset of users in the group of users based at least in part on the viewership status, wherein the subset of users in the group of users is identified based on an affinity of each user in the subset of users for the media content item.

12. The system of claim 11, wherein the affinity of each user in the subset of users for the media content item is determined based on whether each user has interacted with the media content item.

13. The system of claim 12, wherein determining the affinity comprises:
determining that a user in the subset of users has interacted with the media content item via multiple interactions; and
applying a weight to each type of interaction of the multiple interactions, wherein the affinity of the user in the subset of users is based on the weight of each type of interaction of the multiple interactions.

14. The system of claim 8, wherein a user included in a first group of indicators is inhibited from inclusion in a second group of indicators.

15. A non-transitory computer-readable medium containing computer executable instructions that, when executed by a processor, cause the processor to perform a method for indicating media viewership, the method comprising:
identifying a media content item based at least in part on a viewing history of a first user associated with a user device;
receiving a request to present a page that includes a representation of the media content item;
determining, for the media content item, a viewership status of users in a group of users connected to the first user, wherein the viewership status corresponds to one of a different level of engagement with the media content item;

causing the requested page to be presented on the user device, wherein the requested page includes a first portion that includes the representation of the media content item and a second portion that indicates viewership information corresponding to the media content item, wherein the second portion includes a plurality of groups of indicators each corresponding to a different level of engagement with the media content item, wherein each indicator in the group of indicators represents the viewership status of the user and corresponds to a user in the group of users.

16. The non-transitory computer-readable medium of claim 15, wherein the group of users are identified based on a strength of a connection between the first user and users in the group of users.

17. The non-transitory computer-readable medium of claim 15, wherein a level of engagement corresponds to users in the group of users who have not yet watched the media content item and are determined as likely to enjoy the media content item.

18. The non-transitory computer-readable medium of claim 15, wherein the method further comprises identifying a subset of users in the group of users based at least in part on the viewership status, wherein the subset of users in the group of users is identified based on an affinity of each user in the subset of users for the media content item.

19. The non-transitory computer-readable medium of claim 18, wherein the affinity of each user in the subset of users for the media content item is determined based on whether each user has interacted with the media content item.

20. The non-transitory computer-readable medium of claim 19, wherein determining the affinity comprises:
   determining that a user in the subset of users has interacted with the media content item via multiple interactions; and
   applying a weight to each type of interaction of the multiple interactions, wherein the affinity of the user in the subset of users is based on the weight of each type of interaction of the multiple interactions.

21. The non-transitory computer-readable medium of claim 15, wherein a user included in a first group of indicators is inhibited from inclusion in a second group of indicators.

* * * * *